(12) United States Patent
Ukai

(10) Patent No.: US 8,902,477 B2
(45) Date of Patent: Dec. 2, 2014

(54) IMAGE READER, SHEET FEEDING DEVICE AND APPARATUS

(71) Applicant: Shinji Ukai, Ichinomiya (JP)

(72) Inventor: Shinji Ukai, Ichinomiya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 148 days.

(21) Appl. No.: 13/627,418

(22) Filed: Sep. 26, 2012

(65) Prior Publication Data

US 2013/0135697 A1    May 30, 2013

(30) Foreign Application Priority Data

Nov. 30, 2011  (JP) ................................ 2011-261579

(51) Int. Cl.
*H04N 1/04* (2006.01)

(52) U.S. Cl.
USPC .......................................... 358/474; 358/498

(58) Field of Classification Search
USPC .................. 358/498, 474, 400, 401, 496, 497
See application file for complete search history.

(56) References Cited

U.S. PATENT DOCUMENTS

| | | | | |
|---|---|---|---|---|
| 6,349,155 | B1 * | 2/2002 | Youda et al. ................... | 382/312 |
| 7,701,622 | B2 * | 4/2010 | Furihata et al. ............... | 358/498 |
| 7,869,103 | B2 * | 1/2011 | Ikeda ............................. | 358/498 |
| 2002/0038932 | A1 | 4/2002 | Kaiga et al. | |
| 2006/0088336 | A1 * | 4/2006 | Hirose et al. .................. | 399/110 |
| 2006/0269320 | A1 * | 11/2006 | Ishii ............................... | 399/116 |
| 2010/0208311 | A1 * | 8/2010 | Furihata et al. ............... | 358/498 |
| 2010/0245950 | A1 * | 9/2010 | Osakabe ........................ | 358/498 |
| 2010/0277776 | A1 * | 11/2010 | Osakabe ........................ | 358/498 |
| 2011/0242623 | A1 * | 10/2011 | Akimatsu ...................... | 358/498 |
| 2012/0170087 | A1 * | 7/2012 | Nose et al. .................... | 358/498 |
| 2012/0183329 | A1 * | 7/2012 | Sato ............................... | 399/119 |
| 2013/0121708 | A1 * | 5/2013 | Yoo ................................ | 399/21 |

FOREIGN PATENT DOCUMENTS

| | | |
|---|---|---|
| JP | 05-83771 | 11/1993 |
| JP | 08-169581 | 7/1996 |
| JP | 08-231069 | 9/1996 |
| JP | 2000-219347 | 8/2000 |
| JP | 2001-88963 | 4/2001 |
| JP | 2002-87616 | 3/2002 |
| JP | 2002-104680 | 4/2002 |
| JP | 2002-128305 | 5/2002 |
| JP | 2004-59170 | 2/2004 |
| JP | 2005-60091 | 3/2005 |
| JP | 2009-274814 | 11/2009 |

* cited by examiner

*Primary Examiner* — Jerome Grant, II
(74) *Attorney, Agent, or Firm* — Banner & Witcoff, Ltd.

(57) ABSTRACT

A sheet feeding device includes a feeding guide configured to guide a sheet, a separation unit configured to separate the sheet from a plurality of sheets, and a holding portion configured to hold the separation unit. The separation unit may be configured to be removably attached to the holding portion. Further, the holding portion may be configured to move from a first position where the holding portion holds the separation unit in contact with a pressing portion to a second position where the holding portion holds the separation unit away from the pressing portion while remaining connected to the feeding guide. The pressing portion may be configured to press the separation unit toward a feeding roller when the holding portion is in the first position.

20 Claims, 11 Drawing Sheets

IMAGE READER, SHEET FEEDING DEVICE AND APPARATUS

CROSS-REFERENCE TO RELATED APPLICATION

This application claims priority from Japanese Patent Application No. 2011-261579 filed on Nov. 30, 2011, which is incorporated herein by reference.

FIELD OF DISCLOSURE

The disclosure relates to an image reader, a sheet feeding device, and an apparatus.

BACKGROUND

The sheet feeding device may include a first feeding guide configured to guide sheets, a feeding roller configured to feed a sheet, a separation unit disposed in the first feeding guide opposite to the feed roller and a pressing portion configured to press the separation unit toward the feed roller.

In the sheet feeding device, when sheets guided by the first feeding guide are fed by the feed roller, the separation unit pressed by the pressing portion toward the feed roller separates the sheets one by one by sandwiching the sheets between the separation unit and the feed roller. The separation unit may include a pad for creating a frictional force to help separate sheets. This pad may become worn over time, and therefore, it may be desirable to replace the pad.

The separation unit is configured to be removably mounted to the first feeding guide. However, the separation unit is removably mounted to the first feeding guide against pressing force of the pressing portion. That is, when inserting the separation unit, the separation unit is pushed against a force of the pressing portion, which may make such insertion difficult.

SUMMARY

Therefore, a sheet feeding device which overcomes these and other shortcomings of the related art may be desired. A technical advantage of the disclosure may be that a separation unit may be readily removed from or mounted to a sheet feeding device. According to an aspect of the disclosure, an image reader may comprise a first body, a second body, a feeding roller, a pressing portion, a holding portion, a separation unit, and a reading unit. The first body may be pivotably attached to the second body between a close position where the first body contacts the second body and an open position where the first body is away from the second body. The feeding roller may be disposed at one of the first body and the second body. The pressing portion may be disposed at the other one of the first body and the second body. The holding portion may comprise a frame portion having an opening. The holding portion may be pivotably attached to the other one of the first body and the second body between an approaching position and a separate position. The frame portion may approach the pressing portion when the holding portion is in the approaching position. The frame portion may be away from the pressing portion when the holding portion is in the separate position. The separation unit may comprise a separation pad. The separation pad may be configured to be removably attached to the holding portion when the first body is in the open position and the holding portion is in the separate position. The separation pad may contact the pressing portion when the separation unit is attached to the frame portion and the holding portion is in the approaching position in a state that the separation unit is attached to the holding portion. The separation pad may be pressed to the feeding roller by the pressing portion when the first body is in the close position in a state that the separation pad contacts the pressing portion. The reading unit may be configured to read an image of a sheet fed by the feeding roller.

According to an aspect of the disclosure, a sheet feeding device may comprise a feeding guide, a separation unit, a holding portion, and a pressing portion. The feeding guide may be configured to guide a sheet. The separation unit may be configured to separate the sheet from a plurality of sheets. The sheet feeding device may also include a feeding roller configured to feed the sheet. The separation unit and the feeding roller may be arranged to form a gap therebetween. The holding portion may be configured to hold the separation unit. The holding portion may be configured to move from a first position where the holding portion holds the separation unit in contact with pressing portion to a second position where the holding portion holds the separation unit away from the pressing portion while remaining connected to the feeding guide. The separation unit may be configured to be removably attached to the holding portion. The pressing portion may be configured to press the separation unit toward the feeding roller when the holding portion is in the first position.

According to an aspect of the disclosure, an apparatus may comprise a pressing portion and a holding portion. The pressing portion may be configured to press a separation unit against a sheet. Further, the holding portion may be configured to connect to a supporting member, to hold the separation unit, and to move from a first position where the holding portion holds the separation unit in contact with the pressing portion and a second position where the holding portion holds the separation unit away from the pressing portion while remaining connected to the supporting member.

BRIEF DESCRIPTION OF THE DRAWINGS

For a more complete understanding of the disclosure, needs satisfied thereby, and the objects, features, and advantages thereof, reference is now made to the following description taken in connection with the accompanying drawings.

DETAILED DESCRIPTION

Figure 1:
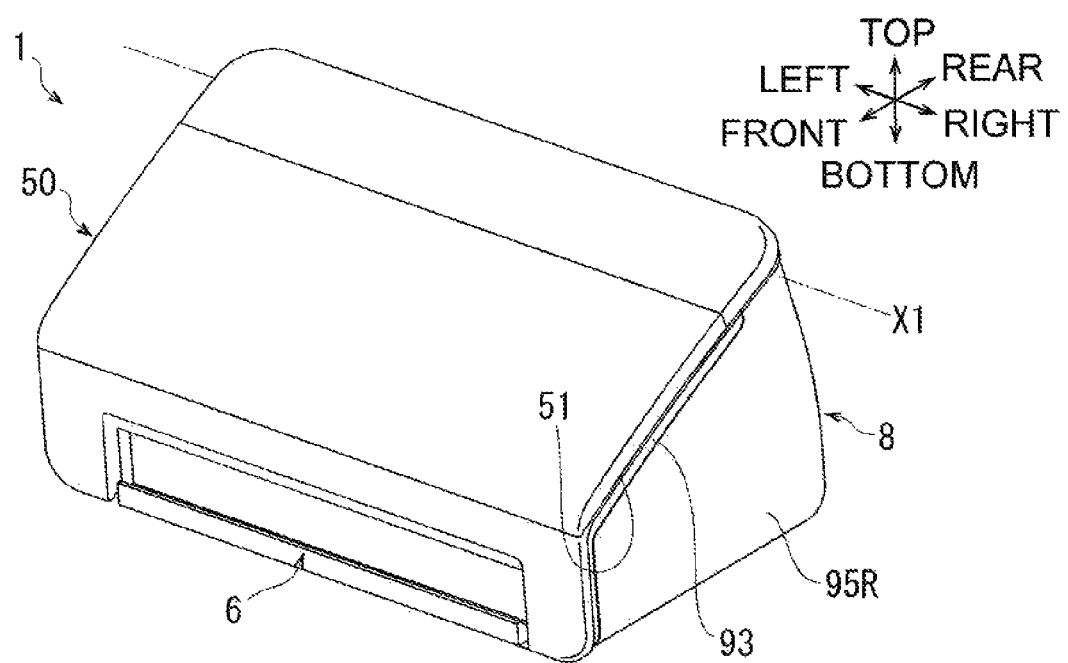
FIG. 1 is a front perspective view of an image reading apparatus including a sheet feeding device in an example embodiment according to one or more aspects of the disclosure.

Example embodiments are described in detail below with reference to the accompanying drawings, like reference numerals being used for like corresponding parts in the various drawings.

In an example embodiment, the aspects of the disclosure may be applied to an image reading apparatus 1 as depicted in FIG. 1. A side of the image reading apparatus 1 on which an output tray 6 is disposed may be defined as the front side. A side of the image reading apparatus 1 disposed on the left when the image reading apparatus 1 is viewed from a side of the output tray 6, i.e., the front side, may be defined as the left side. To facilitate understanding of the orientation and relationship of the various elements disclosed herein, the front, rear, left, right, top, and bottom of the image reading apparatus 1 may be determined with reference to axes of the three-dimensional Cartesian coordinate system included in each of the relevant drawings.

Figure 2:
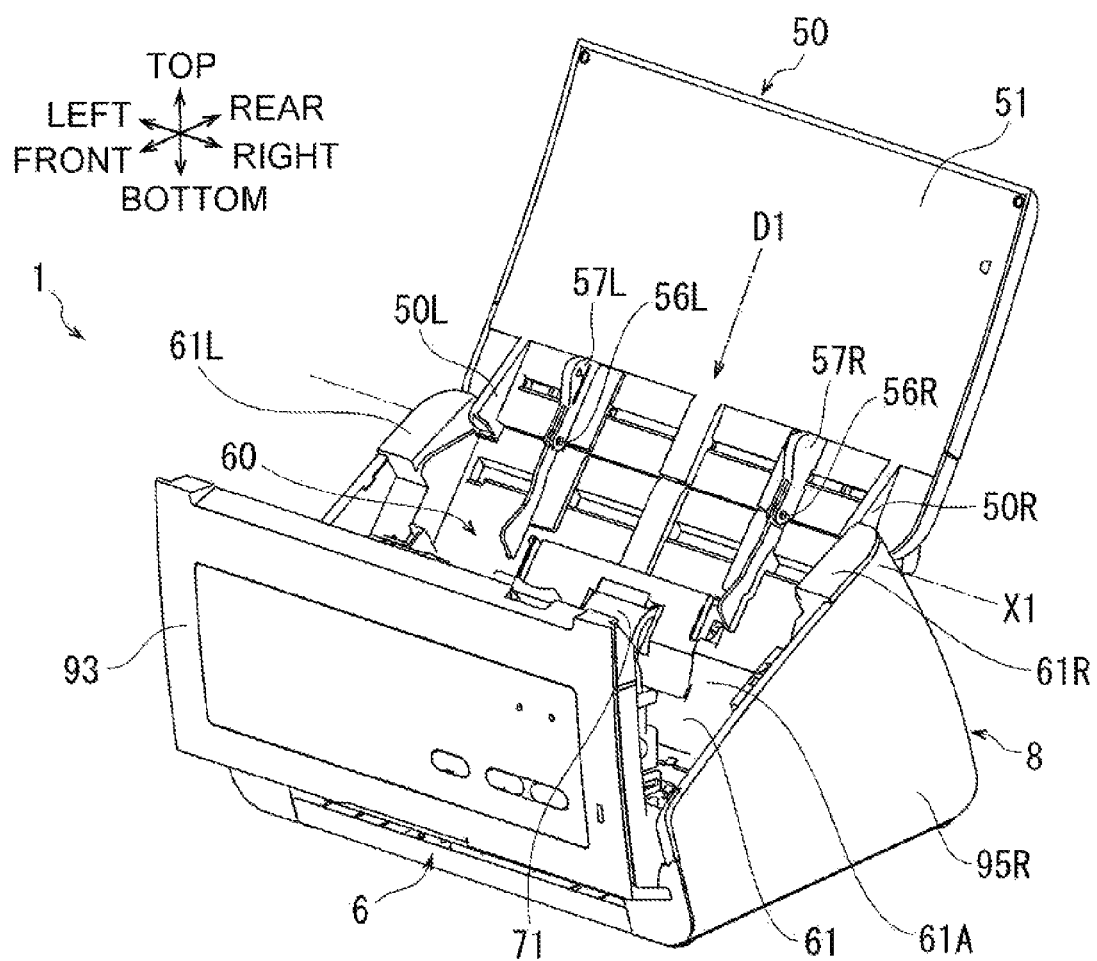
FIG. 2 is a front perspective view of the image reading apparatus, wherein a sheet feeder and an upper cover of the image reading apparatus are open.
Figure 3:
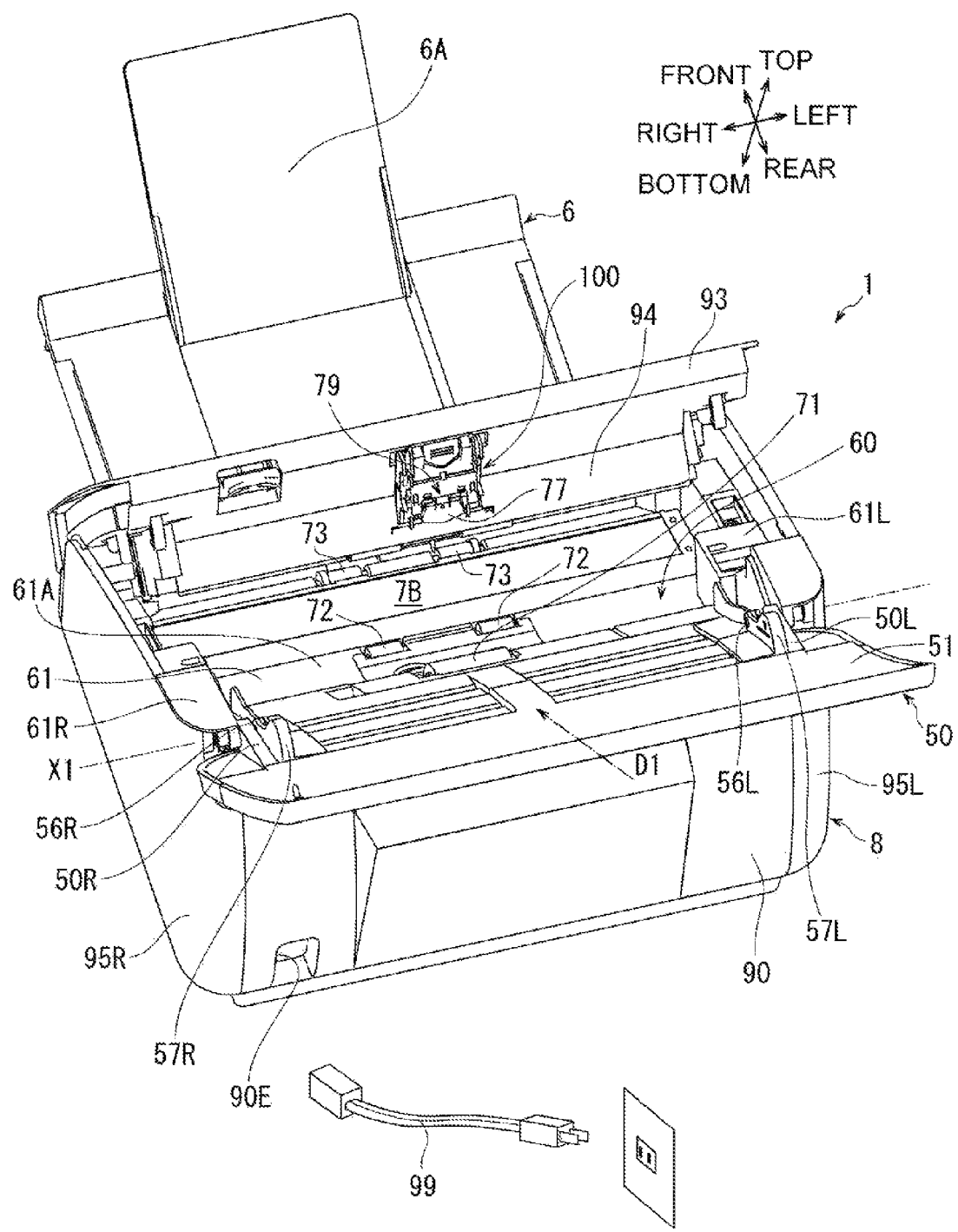
FIG. 3 is a rear perspective view of the image reading apparatus, wherein the sheet feeder, the upper cover are open and an output tray of the image reading apparatus is pulled.
Figure 4:
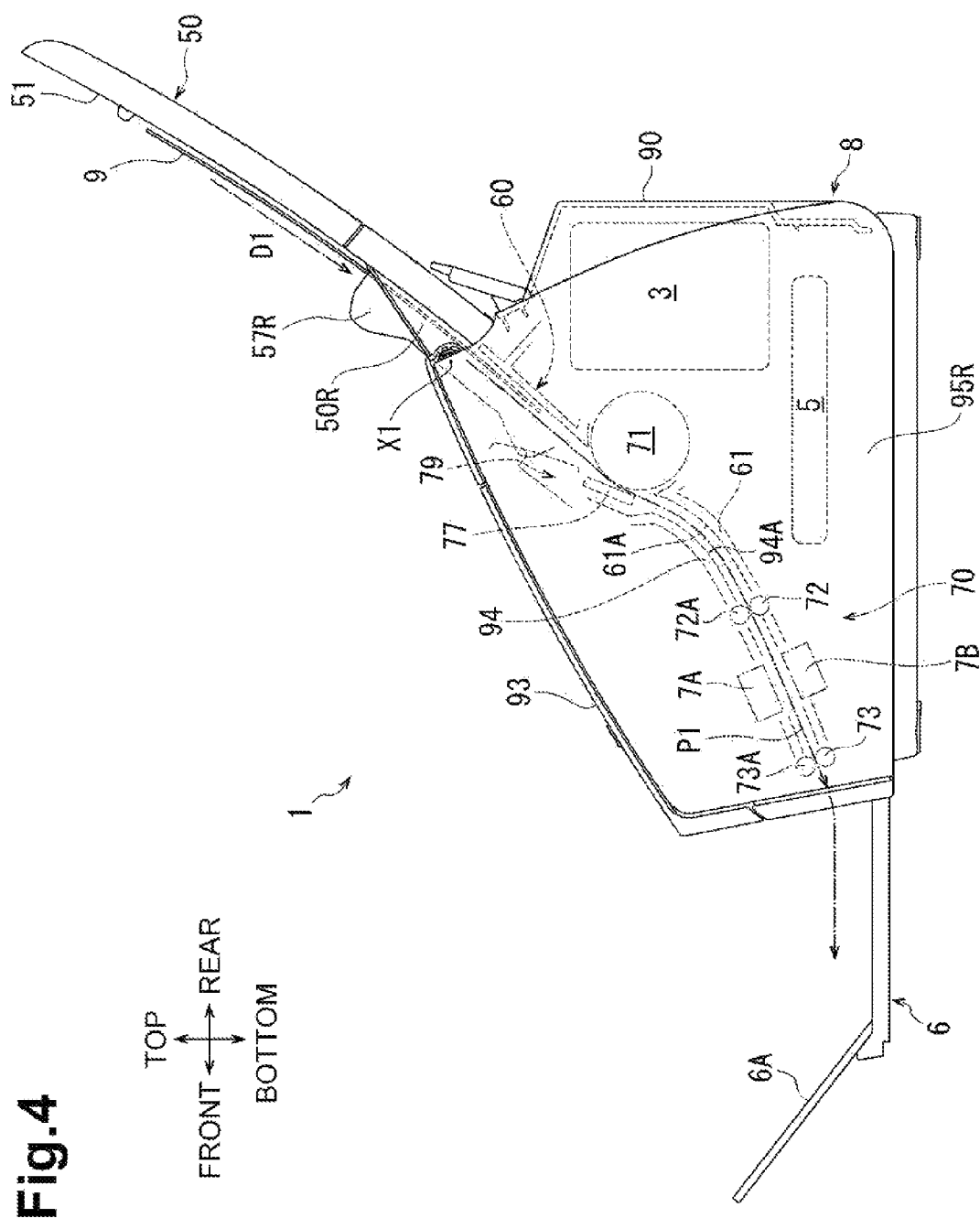
FIG. 4 is a side view of the image reading apparatus.

As depicted in FIGS. 1 to 4, the image reading apparatus 1 may comprise a case 8, a sheet supply tray 50, and the output tray 6. As depicted in FIG. 4, a feed path P1 may be provided in the case 8 to feed sheets 9, e.g., documents, from the sheet supply tray 50 to the output tray 6.

The case 8 may comprise an upper cover 93, a rear cover 90, left and right side covers 95L, 95R, and inner frames enclosed by the covers 93, 90, 95L, 95R. The case 8 may have a box-like shape. The inner frames may comprise a lower chute 60, as depicted in FIGS. 2 to 4, and frame members (not depicted).

Figure 5:
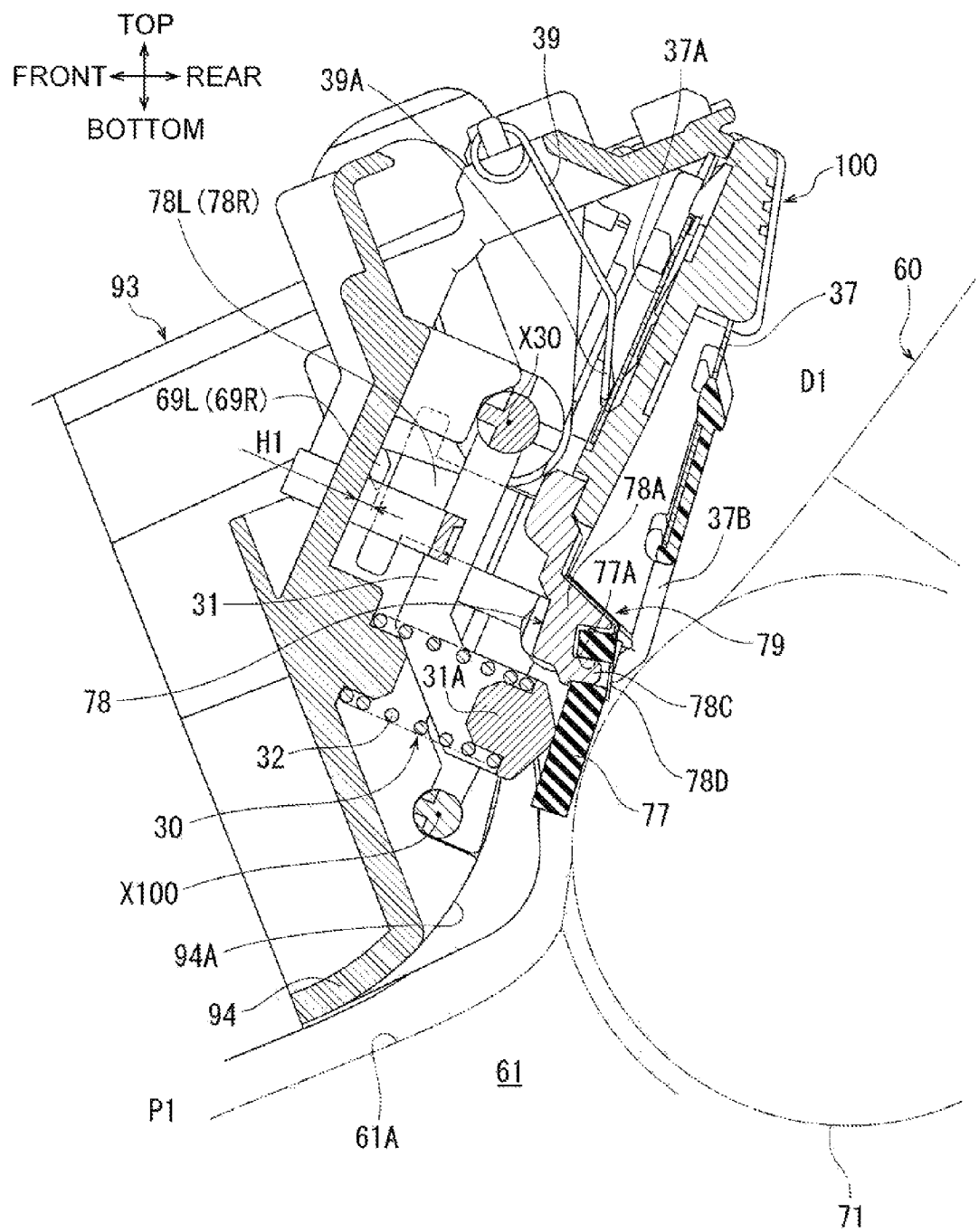
FIG. 5 is an enlarged sectional view of a specific portion of the image reading apparatus, depicting a first feeding guide, a feeding roller, a separation unit, a holding portion and a pressing portion when a holding portion is in a first position.

As depicted in FIG. 4, the upper cover 93 may normally incline in an upward and rearward direction. As depicted in FIG. 5, the upper cover 93 may comprise a first feeding guide 94 configured to oppose the lower chute 60 from above. The first feeding guide 94 may be configured to guide sheets 9. A lower surface of the first feeding guide 94 of the upper cover 93 may comprise an upper guide surface 94A that may function as an upper surface of the feed path P1. As depicted in FIGS. 2 and 3, the upper cover 93 may be configured to pivot such that a rear end of the upper cover 93 may be raised to clear sheet jams or perform maintenance of the image reading apparatus 1. When the upper cover 93 pivots, the upper cover 93 may move away from the lower chute 60 in an upward direction. Thus, a second feeding guide 61 of the lower chute 60, a first feeding roller 71 and a second feeding roller 72 may be exposed to an exterior of the case 8.

The sheet supply tray 50 may have a plate shape. One side of the sheet supply tray 50 may comprise a sheet placing portion 51. The sheet supply tray 50 may comprise a pair of left and right hinges 50L, 50R that may be integrally formed at left and right corners of the sheet supply tray 50, respectively. The sheet supply tray 50 may be pivotally supported by the case 8, via the hinges 50L, 50R, about an axis X1 that may extend at a rear and upper portion of the case 8 in its lateral direction, i.e., in the left and right direction.

As depicted in FIG. 1, when the sheet supply tray 50 is closed, the sheet supply tray 50 may cover the upper cover 93 of the case 8 from above, with the sheet placing portion 51 facing down.

As the sheet supply tray 50 depicted in FIG. 1 is open by pivoting the sheet supply tray 50 about the axis X1, the sheet supply tray 50 may move to a position where the sheet placing portion 51 may face upward on a rear side of the case 8, as depicted in FIGS. 2 to 4.

When the sheet supply tray 50 is open as depicted in FIG. 4, the sheets 9 may be placed on the sheet placing portion 51. The sheets 9 placed on the sheet placing portion 51 may be fed in a feeding direction D1 leading from the sheet supply tray 50 to the output tray 6, to guide the sheets 9 in the feed path P1.

As depicted in FIG. 2 and FIG. 3, the lower chute 60 may comprise the second feeding guide 61 of a plate shape, and side wall portions 61L, 61R that may sandwich the second feeding guide 61 from left and right sides of the guide 61, respectively. The second feeding guide 61 may extend laterally and incline downwardly from a rear side of the case 8 to the output tray 6. As depicted in FIG. 5, an upper surface of the second feeding guide 61 may oppose the upper guide surface 94A of the upper cover 93 from below. An upper surface of the second feeding guide 61 may comprise a lower guide surface 61A that may function as a lower surface of the feed path P1. The lower guide surface 61A may continue to the sheet placing portion 51 when the sheet supply tray 50 is open as depicted in FIGS. 2-4.

As depicted in FIG. 2, the image reading apparatus 1 may comprise a pair of left and right width regulating guides 57L, 57R. The width regulating guides 57L, 57R may extend from the sheet placing portion 51 over the lower guide surface 61A in parallel with the feeding direction D1. The width regulating guides 57L, 57R may comprise coupling portions 56L, 56R, respectively, disposed at middle portions of the width regulating guides 57L, 57R in the feeding direction D1. The coupling portions 56L, 56R may be configured to allow the width regulating guides 57L, 57R to pivotally open or fold about the axis X1 when the sheet supply tray 50 is open or closed.

The width regulating guides 57L, 57R may be configured to move in the lateral direction closer to or away from each other, with the center between the width regulating guides 57L, 57R as a reference. Thus, when the sheet 9 of plural sizes, e.g., business card size, 8.5×11 size, A4 size, etc., is placed on the sheet placing portion 51, the width regulating guides 57L, 57R may position the sheet 9 with respect to the lateral direction, according to the sheet sizes.

As depicted in FIGS. 1, 3, and 4, the output tray 6 may be configured to be pulled from and accommodated into the case 8. As depicted in FIG. 1, when the output tray 6 is accommodated into the case 8, a front end surface of the output tray 6 may be exposed at the front side of the image reading apparatus 1. As depicted in FIGS. 3 and 4, the output tray 6 may comprise an extension plate 6A. The extension plate 6A may be configured to pivotally move so as to extend forwardly from the output tray 6 when the output tray 6 is pulled from the case 8.

As depicted in FIG. 4, the image reading apparatus 1 may comprise a power unit 3, a circuit board 5, a feeding unit 70, a first reading unit 7A and a second reading unit 7B inside the case 8.

As depicted in FIG. 4, the power unit 3 may be disposed on a rear side of the case 8. The power unit 3 may comprise an AC adapter configured to convert household high alternating-current (AC) voltage to a lower direct current (DC) voltage, and supply power to the circuit board 5. The power unit 3 may be covered by the rear cover 90 from a rear side of the image reading apparatus 1. As depicted in FIG. 3, the rear cover 90 may have a connection hole 90E into which an end of a power cable 99 configured to electrically connect a power socket and the power unit 3 is inserted.

As depicted in FIG. 4, the circuit board 5 may be disposed below the power unit 3 in the case 8. The circuit board 5 may be electrically connected to the power unit 3 by electric wirings (not depicted). The circuit board 5 may be electrically connected to the feeding unit 70, the first reading unit 7A and the second reading unit 7B by the electric wirings to control the units 70, 7A, 7B.

The feeding unit 70 may comprise a feeding roller, e.g., a first feeding roller 71, a separation unit 79, a second feeding roller 72, an output roller 73 that may be arranged in this order from an upstream side to the downstream side in the feeding direction D1.

The first feeding roller 71 may be attached to the lower chute 60. The first feeding roller 71 may be positioned in the second feeding guide 61 in the feed path P1. The first feeding roller 71 may be driven by a driving unit (not depicted) to rotate. When the sheet 9, placed on the sheet placing portion 51, contacts the first feeding roller 71, the sheet 9 may be fed in the feeding direction D1. The separation unit 79 may be configured to separate a plurality of the sheets 9 one by one by sandwiching the sheets 9 between the separation unit 79 and the first feeding roller 71 configured to feed the sheets 9.

As depicted in FIGS. 3 and 5, the separation unit 79 may comprise a separation pad 77 having a plate shape. The separation pad 77 may comprise a frictional member comprising rubber or elastomer. The separation unit 79 may be held by a holding portion 100 that may be mounted or assembled to the upper cover 93. The holding portion 100 may be positioned in the first feeding guide 94 in the feed path P1. With the upper cover 93 open, the separation unit 79 may be mounted to the holding portion 100. With the upper cover 93 closed, the separation unit 79 mounted on the holding portion 100 may oppose the first feeding roller 71, as depicted in FIG. 5. A pressing portion 30 may be configured to press the separation unit 79 toward the first feeding roller 71 when the holding portion 100 is in an approaching position, e.g., a first position where the holding portion 100 engages the first feeding guide 94. The pressing portion 30 may apply a force onto the separation pad 77 to press the separation pad 77 against the first feeding roller 71. The separation unit 79 may be configured to separate the sheets 9 one-by-one when a plurality of sheets are fed into the feed path P1 by sandwiching the sheets 9 between the separation pad 77 and the first feeding roller 71.

As depicted in FIG. 4, the second feeding roller 72 and the output roller 73 may be attached to the lower chute 60. The second feeding roller 72 and the output roller 73 may be positioned in the second feeding guide 61 in the feed path P1. The second feeding roller 72 and the output roller 73 may be driven by the driving unit (not depicted) to rotate in synchronization with the first feeding roller 71.

A following roller 72A may be positioned above the second feeding roller 72 to oppose the second feeding roller 72. The following roller 72A may be attached to the upper cover 93. The following roller 72A may be positioned in the first feeding guide 94 in the feed path P1. The following roller 72A may have a force applied thereto by an urging member (not depicted) such that the roller 72A may be pressed against the second feeding roller 72. Thus, the second feeding roller 72 may rotate to feed the sheet 9 in the feed path P1 at the downstream side in the feeding direction D1, while sandwiching the sheet 9 between the second feeding roller 72 and the following roller 72A.

A following roller 73A may be positioned above the output roller 73 to oppose the output roller 73. The following roller 73A may be assembled to the upper cover 93. The following roller 73A may be positioned in the first feeding guide 94 in the feed path P1. The following roller 73A may have a force applied thereto by another element (not depicted) such that the roller 73A may be pressed against the output roller 73. Thus, the output roller 73 may rotate to feed the sheet 9 in the feed path P1 in the downstream side in the feeding direction D1 to the output tray 6, while sandwiching the sheet 9 between the output roller 73 and the following roller 73A.

The first reading unit 7A and the second reading unit 7B may be disposed downstream of the second feeding roller 72 and upstream of the output roller 73 in the feeding direction D1. The first reading unit 7A may be attached to the upper cover 93. The unit 7A may be positioned in the first feeding guide 94 in the feed path P1. The second reading unit 7B may be attached to the lower chute 60. The unit 7B may be positioned in the second feeding guide 61 in the feed path P1. The first reading unit 7A and the second reading unit 7B may be positioned opposite to each other in the vertical direction, i.e., top and bottom direction, with the feed path P1 in between. The first reading unit 7A and the second reading unit 7B may comprise a contact image sensor (CIS) or a charge coupled device (CCD).

The image reading apparatus 1 may read an image on the sheet 9 as follows. As the driving unit (not depicted) is started under the control of the circuit board 5, the first feeding roller 71 may rotate to feed the sheet 9 placed on the sheet placing portion 51 in the feeding direction D1 below the separation pad 79. If plural sheets 9 are fed at one time, frictional force may be applied between the separation pad 79 and the sheets 9 such that the sheets 9 are separated one by one. Then, a single separated sheet 9 may be fed by the second feeding roller 72 toward the first reading unit 7A and the second reading unit 7B.

The sheet 9 may be fed in the feeding direction D1 along the upper guide surface 94A of the first feeding guide 94 and the lower guide surface 61A of the second feeding guide 61. A state of "feeding of the sheet 9 along the upper guide surface 94A and the lower guide surface 61A" may include not only the condition in which the sheet 9 always contacts the upper guide surface 94A and the lower guide surface 61A, but also a case in which the sheet 9 contacts the upper guide surface 94A or the lower guide surface 61A when the sheet 9 deviates from the feed path P1. In other words, the state of "feeding of the sheet 9 along the upper guide surface 94A and the lower guide surface 61A" may include the condition in which the sheet 9 is fed almost in parallel to a direction in which the upper guide surface 94A and the lower guide surface 61A extend.

The circuit board 5 may control the first reading unit 7A and the second reading unit 7B to read an image on each side of the sheet 9. Signals output from the first reading unit 7A and the second reading unit 7B may be transmitted to the circuit board 5 and image data of the read sheet 9 may be generated. The output roller 73 may feed the read sheet 9 to the output tray 6.

Figure 6:
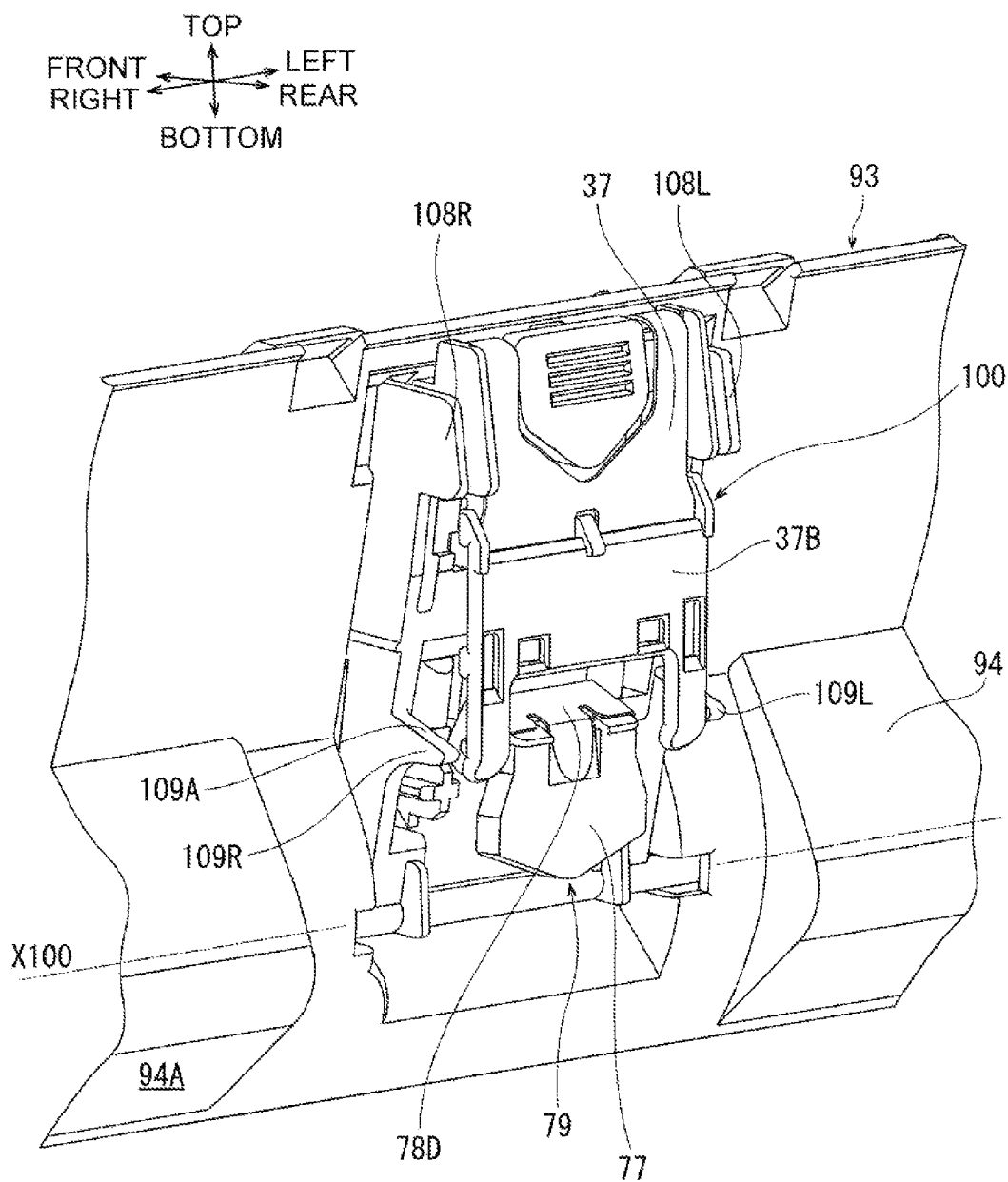
FIG. 6 is an enlarged perspective view of a specific portion of the image reading apparatus, depicting the first feeding guide, the separation unit and the holding portion when the holding portion is in the first position.

As depicted in FIGS. 5 and 6, the image reading apparatus 1 may comprise the separation unit 79, the holding portion 100, and the pressing portion 30.

Figure 7:
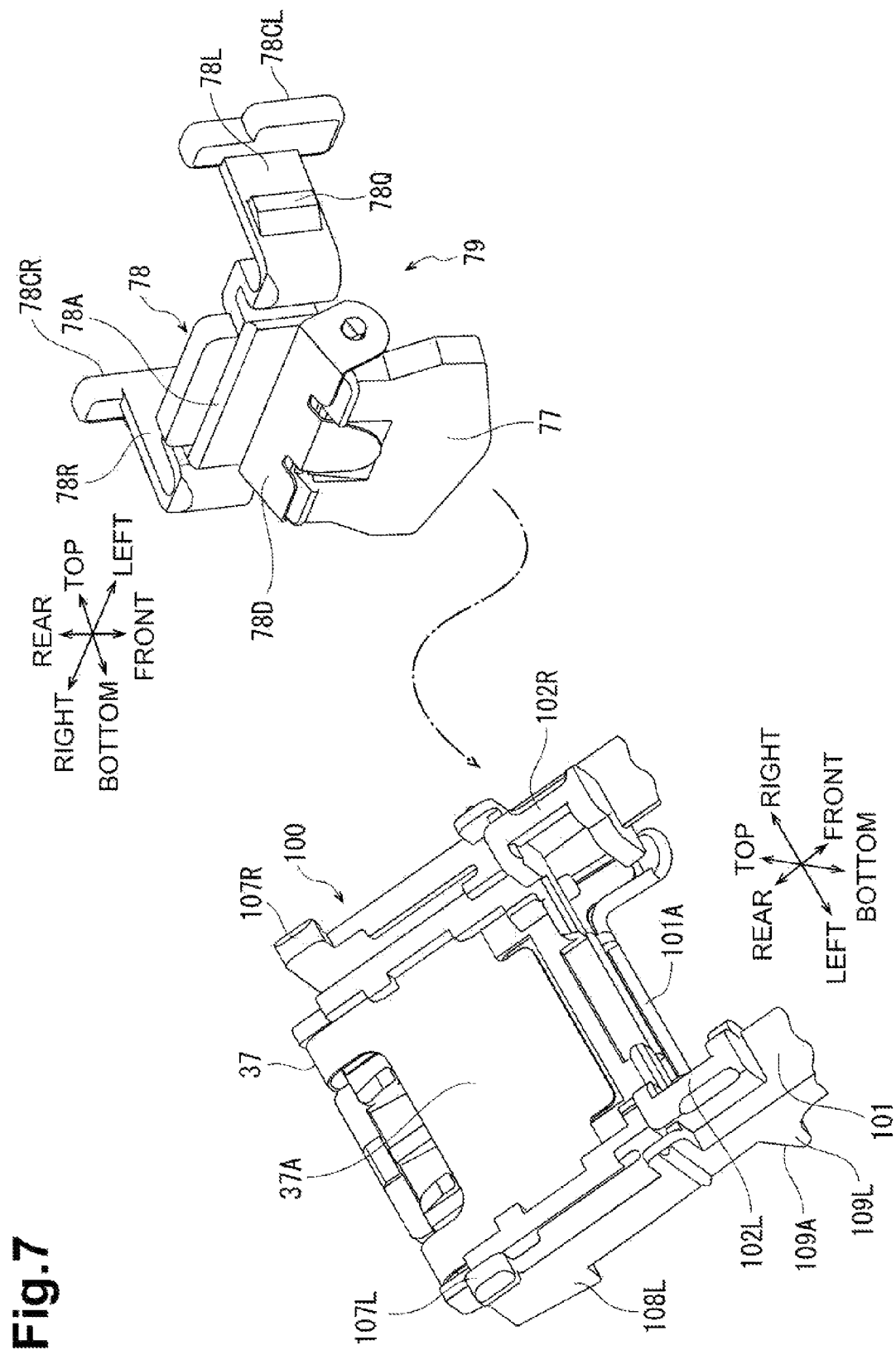
FIG. 7 is a perspective view of the holding portion and the separation unit of the image reading apparatus.

As depicted in FIG. 7, the separation unit 79 may comprise the separation pad 77 and a pad holder 78. The pad holder 78 may comprise a base portion 78A and a protruding portion 78C. As depicted in FIG. 5, the separation pad 77 may have a hole 77A formed on a base end thereof, i.e., an upstream side of the pad 77 in the feeding direction D1. The protruding portion 78C disposed on a lower side of the base portion 78A may be inserted into the hole 77A of the separation pad 77. The pad holder 78 may hold the separation pad 77 by holding the base end of the separation pad 77 with the base portion 78A and a fixing plate 78D (e.g., a metal plate).

As depicted in FIG. 7, the pad holder 78 may comprise a pair of left and right snap-fit portions 78L, 78R. The snap-fit portions 78L, 78R may extend from left and right ends of the base 78A, respectively in a direction away from each other while bending into a crank-like shape. Further, the snap-fit portions 78L, 78R may extend in an approximately perpendicular direction to a surface of the separation pad 77 used to separate the sheets 9. The snap-fit portions 78L, 78R may comprise contact surfaces 78CL, 78CR, respectively, at a further end of each snap-fit portion 78L, 78R away from the separation pad 77. A flat plate portion of each snap-fit portion 78L, 78R elongated in a direction away from the separation pad 77 may comprise an engaged portion 78Q. The engaged portions 78Q of the snap-fit portions 78L, 78R may protrude in a direction opposite to each other in the lateral direction. The engaged portion 78Q may function as a latch.

As depicted in FIGS. 5 and 6, the holding portion 100 may be configured to removably hold the separation unit 79. The separation unit 79 may be configured to be removably attached to the holding portion 100. A lower end, e.g., a base end, of the holding portion 100 may be pivotally supported in the first feeding guide 94 about an axis X100. An upper end, e.g., extremity end, of the holding portion 100 positioned further away from the axis X100 may be configured to engage in the first feeding guide 94 with an engagement mechanism. The engagement mechanism may comprise one or more catch portions 999 disposed in the first feeding guide 94, and one or more engaging arms 107L, 107R as depicted in FIG. 7, disposed at, e.g., upper left and right ends of the holding portion 100, respectively. The engaging arms 107L, 107R may extend toward the first feeding guide 94 when the holding portion 100 is mounted to the image reading apparatus 1. An upper end of the holding portion 100 may comprise grip portions 108L, 108R that may extend in a direction opposite to the engaging arms 107L, 107R. When the grip portions 108L, 108R are elastically deformed in the lateral direction so as to bring the grip portions 108L, 108R closer to each other, the engaging arms 107L, 107R may also be brought closer to each other in the lateral direction, in correspondence with the deformation of the grip portions 108L, 108R. As the engaging arms 107L, 107R engage with the respective engaged portions, the holding portion 100 may be supported in the first feeding guide 94 close to the first feeding guide 94. The position of the holding portion 100 depicted in FIGS. 5 and 6 may be defined as a first position. In FIG. 5, the first feeding guide 94 is brought closer to the second feeding guide 61. In FIG. 6, the first feeding guide 94 is moved away from the second feeding guide 61. FIG. 6 is an enlarged view of a portion of the first feeding guide 94 depicted in FIGS. 2 and 3.

Figure 8:
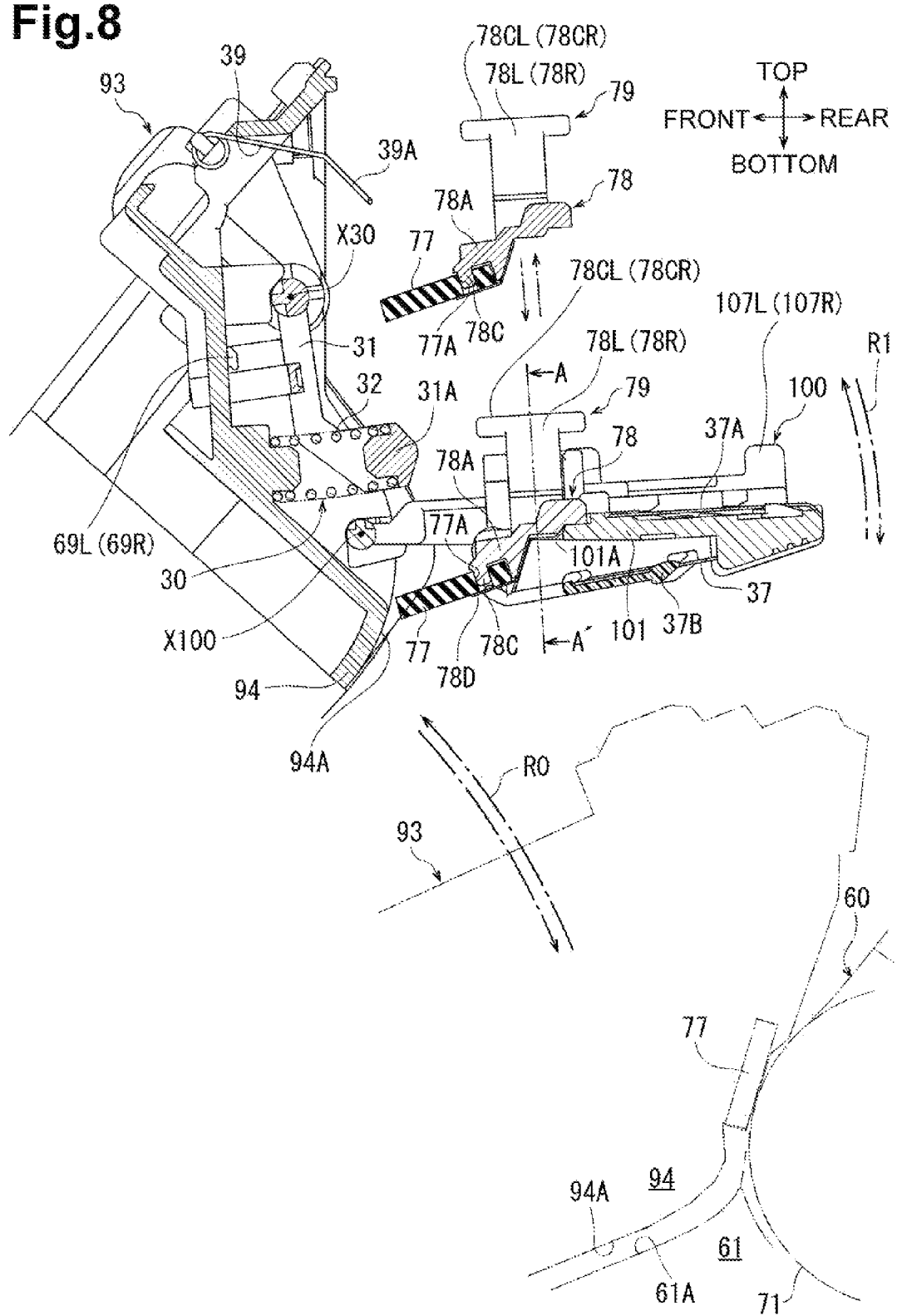
FIG. 8 is an enlarged perspective view of a specific portion of the image reading apparatus, depicting the first feeding guide, the feeding roller, the separation unit, the holding portion and the pressing portion when the holding portion is in a second position.
Figure 9:
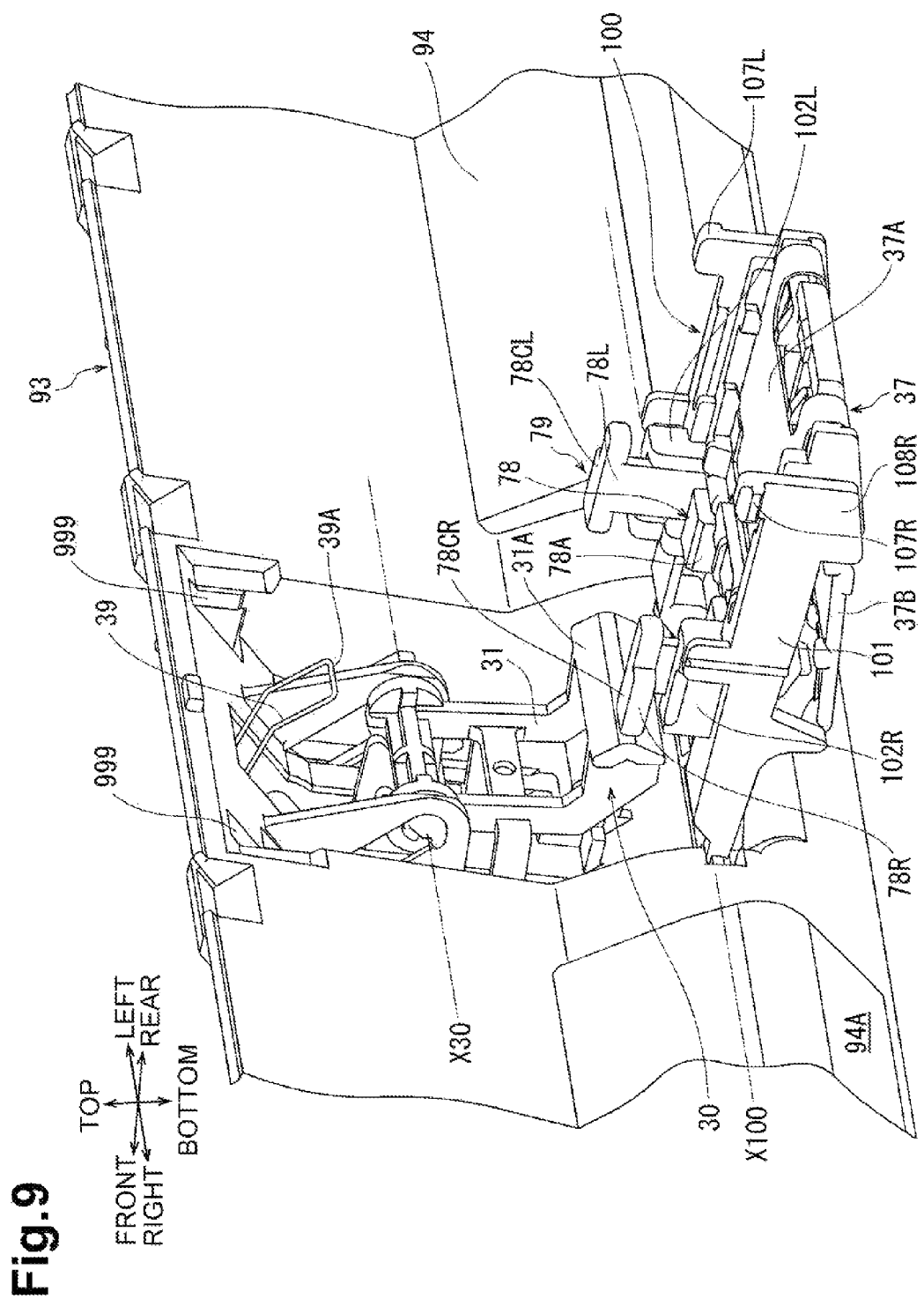
FIG. 9 is an enlarged perspective view of a specific portion of the image reading apparatus, depicting the first feeding guide, the separation unit and the holding portion when the holding portion is in the second position.

In a situation where the first feeding guide 94 is moved away from the second feeding guide 61 as depicted in FIG. 6, a user may hold the grip portions 108L, 108R to bring the grip portions 108L, 108R closer to each other in the lateral direction. In association with the elastic deformation of the grip portions 108L, 108R, the engaging arms 107L, 107R may also be brought closer to each other in the lateral direction. The engaging arms 107L, 107R may disengage from the catch portions 999. As a user thus releases the engagement mechanism, the holding portion 100 may be allowed to pivot about the axis X100. As depicted in FIGS. 8 and 9, the holding portion 100 may pivot about the axis X100 such that the upper end of the holding portion 100 may move rearward to a horizontal position. Thus, the holding portion 100 may be moved away from the first feeding guide 94. The position of the holding portion 100 depicted in FIGS. 8 and 9 may be defined as a separate position, e.g., a second position. In FIGS. 8 and 9, the first feeding guide 94 is moved away from the second feeding guide 61, similar to FIG. 6. As depicted in FIG. 8, a direction R1 in which the holding portion 100 may pivotally move to the second position may be opposite to a direction R0 in which the first feeding guide 94 may move away from the second feeding guide 61. Thus, the holding portion 100 may be configured to move to the first position where the holding portion 100 approaches the first feeding guide 94 and the second position where the holding portion 100 is away from the first feeding guide 94.

As depicted in FIG. 7, the holding portion 100 may comprise a frame 101 and a pair of left and right engaging portions 102L, 102R. The frame 101 may define an opening 101A. The opening 101A may be located at approximately a middle portion of the holding portion 100 in the lateral direction. The opening 101A may be configured to receive the separation unit 79.

Figure 10:
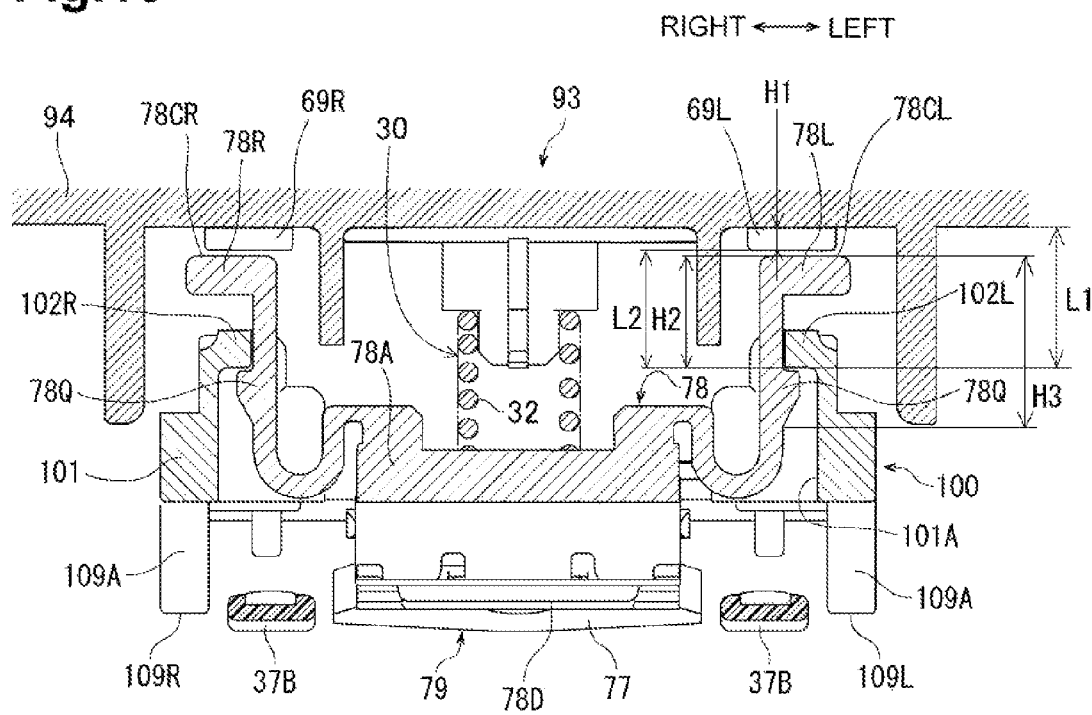
FIG. 10 is an enlarged sectional view of a specific portion of the image reading apparatus, taken along line A-A' of FIG. 8.

As depicted in FIGS. 7 and 10, the engaging portions 102L, 102R may oppose each other in the lateral direction. The engaging portions 102L, 102R may extend in a direction perpendicular to the frame 101, i.e., an extending direction of the engaging arms 107L, 107R. Each engaging portion 102L, 102R may comprise a pair of first portions extending laterally and a second portion extending between the first portions.

As depicted in FIG. 10, the pad holder 78 of the separation unit 79 may be configured to removably engage with the frame 101 of the holding portion 100. As the pad holder 78 engages with the frame 101, the engaged portions 78Q of the snap-fit portions 78L, 78R may engage with the engaging portions 102L, 102R. Thus, separation of the pad holder 78 from the frame 101 may be reduced. The pad holder 78 may be removed or pulled from the opening 101A as a user holds ends of the snap-fit portions 78L, 78R so as to bring the snap-fit portions 78L, 78R closer to each other while elastically deforming the snap-fit portions 78L, 78R. The engaged portions 78Q of the snap-fit portions 78L, 78R may disengage from the respective engaging portions 102L, 102R. The snap-fit portions 78L, 78R may make sliding contact with the engaging portions 102L, 102R, respectively, so as to allow the pad holder 78 to be removed from the frame 101. Thus, the pad holder 78 may be removed from the frame 101.

To set the pad holder 78 in the frame 101, as depicted in FIG. 8, the pad holder 78 may be inserted into the opening 101A as a user holds the ends of the snap-fit portions 78L, 78R to bring the snap-fit portions 78L, 78R closer to each other, while elastically deforming the snap-fit portions 78L, 78R. The snap-fit portions 78L, 78R may make sliding contact with the engaging portions 102L, 102R, respectively, to allow the pad holder 78 to engage with the frame 101. Thus, the pad holder 78 may engage with the frame 101. As depicted in FIG. 10, as the pad holder 78 engages with the frame 101, the engaged portions 78Q may move opposite to each other by the restoring force of the snap-fit portions 78L, 78R, to engage with the respective engaging portions 102L, 102. Thus, separation of the pad holder 78 from the frame 101 may be reduced.

As depicted in FIGS. 5 and 8, the pressing portion 30 may comprise a pressing body 31 and a spring 32.

An upper end of the pressing body 31 may be pivotally supported in the first feeding guide 94 about an axis X30. The axis X30 may be positioned above the axis X100 of the holding portion 100. A lower end of the pressing body 31 may comprise a contact portion 31A of generally a triangular prism shape extending laterally.

As depicted in FIGS. 5 and 8, the spring 32 may comprise a compression coil spring. The spring 32 may be disposed between the contact portion 31A and the first feeding guide 94.

As depicted in FIG. 5, when the holding portion 100 is in the first position, the contact portion 31A may be positioned opposite to the first feeding roller 71 with respect to the separation pad 77. The spring 32 may urge the contact portion 31A toward the separation pad 77, so that the separation pad 77 may be pressed toward the first feeding roller 71 when the first feeding guide 94 is brought closer to the second feeding guide 61.

As depicted in FIG. 8, when the holding portion 100 is in the second position, the separation pad 77 may stay away from the contact portion 31A of the pressing portion 30 by pivoting about the axis X100 in the direction R1. In correspondence with extension of the spring 32 to its natural length, the contact portion 31A may pivot about the axis X30 to move away from the holding portion 100 and the separation unit 79.

Figure 11:
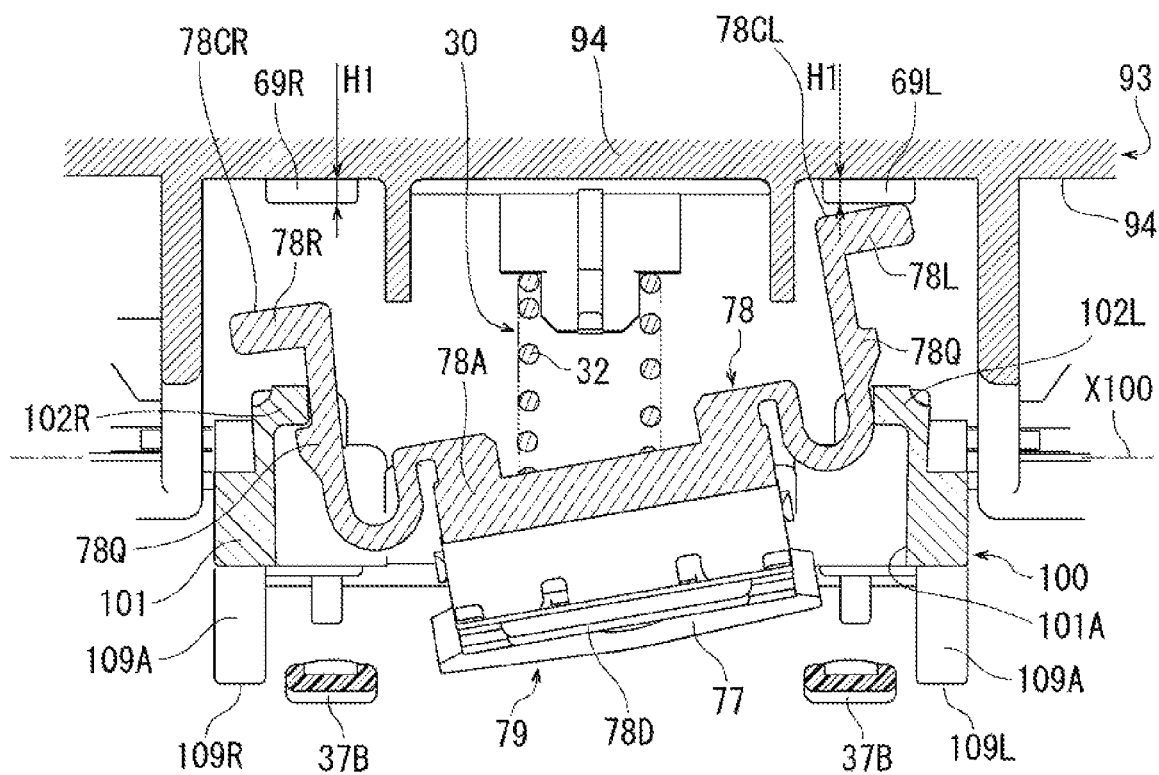
FIG. 11 is an enlarged sectional view of a specific portion of the image reading apparatus, wherein a position of the separation unit is corrected by protrusions of the first feeding guide when the holding portion is moved to the first position.

As depicted in FIGS. 5, 10 and 11, the first feeding guide 94 may comprise one or more protrusions 69 (e.g., left and right protrusions 69L, 69R). The protrusions 69L, 69R may protrude by a height H1 in a rearward and downward direction toward the first feeding roller 71 when the first feeding guide 94 is brought closer to the second feeding guide 61. As depicted in FIG. 10, when the holding portion 100 is in the first position, a space may be provided between the protrusions 69L, 69R and the contact surface 78CL, 78CR of the snap-fit portions 78L, 78R of the pad holder 78, respectively. The protrusions 69L, 69R have a height H1 such that the protrusion corrects the orientation of the separation unit 79.

FIG. 11 illustrates that the position (or orientation) of the separation unit 79 may be corrected when the holding portion 100 is moved into the first position. In some cases, a user may incorrectly insert the separation unit 79 into the opening 101A of the holding portion 100 without locking the separation unit 79 to the holding portion 100. For example, the separation unit 79 may be placed over the opening 101A without engaging the snap-fit portions 78L, 78R with the holding portion 100. In another example, the separation unit may be slantingly mounted to the holding portion 100. As depicted in FIG. 11, for example, the engaged portion 78Q of the right snap-fit portion 78R may engage with the right engaging portion 102R, but the engaged portion 78Q of the left snap-fit portion 78L might not engage with the left engaging portion 102L. In this state, as the holding portion 100 is pivotally moved about the axis X100 to the first position, the contact surface 78CL of the left snap-fit portion 78L may contact the left protrusion 69L before the holding portion 100 completely moves to the first position. The left snap-fit portion 78L may be pressed by the left protrusion 69L until the holding portion 100 completely moves to the first position. Thus, the left snap-fit portion 78L may elastically deform while contacting the left engaging portion 102L, so that the engaged portion 78Q of the left snap-fit portion 78L may engage with the left engaging portion 102L. When the engaged portion 78Q of the left snap-fit portion 78L engages with the left engaging portion 102L but the engaged portion 78Q of the right snap-fit portion 78R does not engage with the right engaging portion 102R, or either engaged portion 78Q of the snap-fit portions 78L, 78R does not engage with the respective engaging portions 102L, 102R, the position of the separation unit 79 may be corrected as described above. Thus, when the holding portion 100 is moved to the first position, the protrusions 69L, 69R may contact at least one of the contact surfaces 78CL, 78CR of the snap-fit portions 78L, 78R, to correct position of the separation unit 79.

The position of the separation unit 79, which may be slantingly mounted to the holding portion 100, may be corrected when the following conditions are satisfied. As depicted in FIG. 10, the protrusions 69L, 69R may be positioned to overlap with the contact surface 78CL, 78CR of the separation unit 79 in a projecting direction of the protrusion 69L, 69R. The protrusions 69L, 69R may have a height H1 such that the protrusion may correct the orientation of the separation unit 79. For example, a distance L1 between the first feeding guide 94 and an edge of the engaging portion 102L, 102R on a side opposite to the protrusion 69L, 69R in the projecting direction when the holding portion 100 is in the first position may be equal to or more than a sum of the height H1 of the protrusions 69L, 69R in the protruding direction and a distance H2 between the contact surfaces 78CL, 78CR and the edge of the respective engaging portion 102L, 102R when the holding portion 100 is in the first position. A distance L2 between the protrusion 69L, 69R and the edge of the respective engaging portion 102L, 102R when the holding portion 100 is in the first position may be smaller than a distance H3 from the contact surfaces 78CL, 78CR to an end of the engaged portions 78Q opposite to the protrusions 69L, 69R. The distance of the gap between the protrusions 69L, 69R and the engaging portions 102L, 102R, respectively, may be determined by the height H1 which may satisfy the conditions described above. Thus, it may depend on the height H1 whether the contact surfaces 78CL, 78CR contacts the protrusions 69L, 69R, respectively, and the protrusions 69L, 69R corrects the orientation of the separation unit 79 when the holding portion 100 is moved to the first position.

As depicted in FIG. 5, a sheet pressing portion, e.g., a plate spring 37, may be disposed at the upper portion of the holding portion 100. A base 37A of the plate spring 37, as depicted in FIG. 7, may be fixed to a side of the holding portion 100 that may oppose the first feeding guide 94.

When the first feeding guide 94 is brought closer to the second feeding guide 61 as depicted in FIG. 5, the plate spring 37 may extend to approach the first feeding roller 71 from the upstream of the first feeding roller 71 in the feeding direction D1, along the upper guide surface 94A of the first feeding guide 94. The plate spring 37 may comprise metal. A contact plate 37B configured to contact the sheet 9 may be fixed to a portion of the plate spring 37 closer to the first feeding roller 71. The contact plate 37B may comprise resin. The contact plate 37B may partially cover the plate spring 37 to reduce such possibilities that a user may touch the metallic plate spring 37. The plate spring 37 may be configured to press the sheet 9 approaching the separation unit 79 toward the first feeding roller 71, via the contact plate 37B. The plate spring 37 may be provided only for the holding portion 100. A sponge-like material may be disposed between the plate spring 37 and the holding portion 100 to reduce noises occurring from the plate spring 37.

As depicted in FIGS. 6 and 10, the holding portion 100 may comprise a pair of left and right sheet entry regulating portions 109L, 109R. The pair of left and right sheet entry regulating portions may extend in the rear direction. The separation pad 77 and the contact plate 37B are positioned between left sheet entry regulating portion and right sheet entry regulating portion in the lateral direction. The sheet entry regulating portions 109L, 109R may protrude toward the second feeding guide 61 when the holding portion 100 is in the first position. A face 109A of the sheet entry regulating portions 109L, 109R that may face an upstream side in the feeding direction D1, may be perpendicular to the feed path P1. Given the structure described herein, when an excess number of the sheets 9 approaches the separation pad 77, the excess sheets 9 may contact the face 109A and consequently may stop. Thus, the sheet entry regulating portions 109L, 109R may regulate the number of the sheets 9 approaching the separation pad 77.

As depicted in FIGS. 5, 8, and 9, the image reading apparatus 1 may comprise a conductive member 39. The conductive member 39 may comprise a metal wire that may be folded. The conductive member 39 may be disposed above the pressing portion 30 in the first feeding guide 94. As depicted in FIG. 5, an end 39A of the conductive member 39 may extend downwardly. The end 39A may be positioned to contact the base 37A of the plate spring 37 when the holding portion 100 is in the first position. The other end (not depicted) of the conductive member 39 may be connected to a ground (not depicted) inside the case 8. The conductive member 39 may be configured to discharge static electricity occurring due to sliding contact between the sheets 9 approaching the separation unit 79 and the plate spring 37, from the plate spring 37. As depicted in FIGS. 8 and 9, when the holding portion 100 is in the second position, the conductive member 39 may stay away from the plate spring 37.

In the image reading apparatus 1 according to the embodiment, to replace the separation unit 79, the first feeding guide 94, which may be positioned closer to the second feeding guide 61 as depicted in FIG. 5, may be moved away from the second feeding guide 61, as depicted in FIGS. 3 and 6. Then, as depicted in FIGS. 8 and 9, the holding portion 100 may be moved to the second position away from the first feeding guide 94. Accordingly, the contact portion 31A of the pressing portion 30 may move away from the separation pad 77 of the separation unit 79, so that pressing force might not be applied to the separation unit 79. In this state, a user may hold the ends of the snap-fit portions 78L, 78R so as to bring the snap-fit portions 78L, 78R closer to each other while elastically deforming the snap-fit portions 78L, 78R. The pad holder 78 may be pulled upwardly to remove the separation unit 79 from the holding portion 100. The separation unit 79 may be mounted to the holding portion 100 in a retrograde order. When the separation unit 79 may be removed from or mounted to the holding portion 100, the pressing force of the pressing portion 30 might not be applied.

Therefore, the separation unit 79 may be readily removed from or mounted to the image reading apparatus 1.

In the image reading apparatus 1, the first feeding guide 94 may be configured to move away and toward the second feeding guide 61. The first feeding guide 94 may pivotally support the holding portion 100 in the first position and the second position. With the first feeding guide 94 away from the second feeding guide 61, the separation unit 79 may be replaced. Therefore, the separation unit 79 might not interfere with the second feeding guide 61 when the separation unit 79 is removably mounted to the holding portion 100. Consequently, the separation unit 79 may be readily removed from or mounted to the image reading apparatus 1.

Further, in the image reading apparatus 1, when the holding portion 100 is in the second position, the holding portion 100 may be configured to hold the separation unit 79 so as to allow the separation unit 79 to be removably mounted to the holding portion 100 in a direction to oppose the first feeding roller 71. When the separation unit 79 configured to oppose the first feeding roller 71 is removed from or mounted to the holding portion 100, users may generally recognize that the separation unit 79 needs to be moved away from or toward the first feeding roller 71. The direction to oppose the first feeding roller 71 may be likely to comply with such a general recognition of user. Therefore, users may removably mount the separation unit 79 to the holding portion 100 in a direction to oppose the first feeding roller 71. Thus, possibilities that users mistake the direction of removably mounting the separation unit 79 to the holding portion 100 may be reduced.

In the image reading apparatus 1, the holding portion 100 may be configured to move to the second position by pivoting in the direction R1 opposite to the direction R0 in which the first feeding guide 94 moves away from the second feeding guide 61. With the structure, as compared with the case in which the holding portion 100 is moved to the second position by pivoting in the direction R0, the separation unit 79 might not interfere with the second feeding guide 61 when the separation unit 79 is removably mounted to the holding portion 100. Consequently, the separation unit 79 may be more easily removed from or mounted to the image reading apparatus 1.

Further, in the image reading apparatus 1, the first feeding guide 94 may comprise the protrusions 69L, 69R that may extend toward the separation unit 79 when the holding portion 100 is in the first position. The protrusions 69L, 69R may have the height H1. With the height H1, when the separation unit 79 is slantingly mounted to the holding portion 100, the protrusion 69L, 69R may correct the position of the separation unit 79 by contacting a portion of the separation unit 79 as the holding portion 100 is moved to the first position. Given this structure, even when the separation unit 79 is slantingly mounted to the holding portion 100, the protrusion 69L, 69R may contact a portion of the separation unit 79 to correct the position of the separation unit 79, as the holding portion 100 is moved to the first position. Therefore, likelihood that the separation unit 79 is properly mounted to the holding portion 100 may be increased.

In the image reading apparatus 1, the plate spring 37 configured to press the sheet 9 approaching the separation unit 79 toward the first feeding roller 71 may be provided on the holding portion 100. If the plate spring 37 is provided on the separation unit 79 as well, the plate spring 37 would have to be replaced together with the separation unit 79 when the separation unit 79 is replaced. Thus, by allowing the separation unit 79 to be removed without removing the plate spring 37, reduction in replacement component costs may be achieved. Nevertheless, in some embodiments, the plate spring 37 may be replaced when the separation unit 79 is replaced.

Further, the image reading apparatus 1 may comprise the conductive member 39. The conductive member 39 may be disposed in the first feeding guide 94. The conductive member 39 may be positioned to contact the plate spring 37 when the holding portion 100 is in the first position. The conductive member 39 may discharge static electricity from the plate spring 37. The conductive member 39 may be configured to stay away from the plate spring 37 when the holding portion 100 is in the second position. Moreover, the conductive member 39 may be configured to discharge static electricity building on the plate spring 37 due to feeding of the sheets 9 in the image reading apparatus 1 may be discharged. Further, the conductive member 39 might not interfere with the removal and mounting of the separation unit 79 from the holding portion 100.

In the image reading apparatus 1, the holding portion 100 may comprise the frame 101 and a pair of the engaging portions 102L, 102R. The separation unit 79 may comprise the separation pad 77, the pad holder 78, and a pair of the snap-fit portions 78L, 78R. The snap-fit portions 78L, 78R may make sliding contact with the engaging portions 102L, 102R, respectively, while elastically deforming, when the separation unit 79 is removably mounted to the holding portion 100, to allow the pad holder 78 to engage with or disengage from the frame 101. With the engaging portions 102L, 102R and the snap-fit portions 78L, 78R, the separation unit 79 may be readily removed from or mounted to the image reading apparatus 1.

Further, in the image reading apparatus 1, the holding portion 100 may comprise the sheet entry regulating portions 109L, 109R. The sheet entry regulating portions 109L, 109R may protrude toward the second feeding guide 61. When the holding portion 100 is in the first position with the first feeding guide 94 brought closer to the second feeding guide 61, the sheet entry regulating portions 109L, 109R may regulate the number of the sheets 9 approaching the separation pad 77. The sheet entry regulating portions 109L, 109R may be positioned in proximity to the holding portion 100, so that the sheets 9 may be regulated immediately before the separation pad 77. Therefore, feeding of plural sheets 9 at one time may be reduced.

While the disclosure has been described in detail with reference to the specific embodiment thereof, it would be apparent to those skilled in the art that various changes, arrangements and modifications may be applied therein without departing from the spirit and scope of the disclosure.

For example, as described above, the first feeding guide 94 configured to support the holding portion 100, which may removably hold the separation unit 79, may be positioned above the second feeding guide 61 configured to support the first feeding roller 71. However, in some embodiments, the positional relation between the separation unit 79 and the first feeding roller 71 may be reversed.

As described above, the direction in which the separation unit 79 is removably mounted to the holding portion 100 may be the vertical direction. However, in some embodiments, the direction in which the separation unit 79 is removably mounted to the holding portion 100 may not be limited to the vertical direction. For example, when the holding portion 100 is configured to pivotally move to a position further than the second position depicted in FIG. 8, a direction in which the separation unit 79 is removably mounted to the holding portion 100 may be a rearward slanting direction.

As described above, the holding portion 100 may be configured to pivot in the direction R1 opposite to the direction R0 in which the first feeding guide 94 moves away from the second feeding guide 61. However, in some embodiments, the holding portion 100 may be configured to pivotally move to the second position in the direction R0.

A shape of the protrusions 69L, 69R may not be limited to the above-described shape but may include a rib, a knob, or a stepped shape.

As described above, the separation unit 79 may comprise two components of the separation pad 77 and the pad holder 78. However, in some embodiments, the separation unit 79 may comprise a single component of a separation pad. In this case, the separation pad may be integrally formed with a pair of engaged portions that may have the similar shape to the snap-fit portions 78L, 78R. Thus, the holding portion 100 may removably hold the separation pad.

As described above, the sheet pressing portion may comprise the plate spring 37. However, in some embodiments, the sheet pressing portion may not be limited to the plate spring 37 but may include a coil spring. The material of the sheet pressing portion may not be limited to metal but may include other materials, e.g., resin, fiber-reinforced resin, or foaming materials having good cushioning performances.

As described above, the holding portion 100 may move between a first position and a second position. This movement may include sliding, rotating, bending, etc.

The one or more aspects of the disclosure may be applied to other devices, e.g., image forming devices or multi-function devices configured to operate as a facsimile, a copier, a printer, or a scanner, or any combination thereof, than the image reading apparatus 1.

While the disclosure has included various example structures and illustrative embodiments, it will be understood by those skilled in the art that other variations and modifications of the structures and embodiments described above may be made without departing from the scope of the disclosure. Other structures and embodiments will be apparent to those skilled in the art from a consideration of the specification or practice of the embodiments disclosed herein. It is intended that the specification and the described examples are illustrative.

What is claimed is:

1. An image reader comprising:
   a first body;
   a second body movably attached to the first body, wherein the first body is configured to move between a closed position where the first body contacts the second body and an open position where the first body is away from the second body;
   a feeding roller attached to the second body;
   a pressing portion attached to the first body;
   a holding portion pivotably attached to the first body, wherein the holding portion is configured to pivot between a first position and a second position, wherein the holding portion is closer to the pressing portion when the holding portion is in the first position than when the holding portion is in the second position;
   a separation unit comprising a separation pad configured to be removably attached to the holding portion when the first body is in the open position and the holding portion is in the second position, wherein the separation pad is positioned to contact the pressing portion when the separation unit is attached to the holding portion and the holding portion is in the first position and to be pressed toward the feeding roller by the pressing portion when the first body is in the closed position; and
   a reading unit configured to read an image of a sheet fed by the feeding roller.

2. The image reader according to claim 1, wherein the holding portion is configured to receive the separation unit from a side of the holding portion opposite to a side of the holding portion that opposes the feeding roller when the first body is in the closed position.

3. The image reader according to claim 1, wherein the holding portion is configured to pivot to the second position from the first position by pivoting in a direction opposite to a direction in which the first body moves away from the second body.

4. The image reader according to claim 1, further comprising an adjustment portion configured to correct a position of the separation unit when the separation unit is incorrectly attached to the holding portion.

5. The image reader according to claim 1, wherein the first body comprises a protrusion,
   the holding portion comprises an engaging portion configured to engage with the separation unit,
   the separation unit comprises an engaged portion configured to engage with the holding portion and a contact surface configured to assist in positioning the separation unit within the holding portion by contacting the protrusion, a distance between the first body and an edge of the engaging portion on a side opposite to the protrusion when the holding portion is in the first position is equal to or greater than a sum of a length of the protrusion in a protruding direction and a distance between the contact surface and the edge of the engaging portion when the holding portion is in the first position, and a distance between the protrusion and the edge of the engaging portion when the holding portion is in the first position is less than a distance from the contact surface to an end of the engaged portion opposite to the protrusion.

6. A sheet feeding device comprising:
a first feeding guide configured to guide a sheet;
a feeding roller configured to feed the sheet;
a separation unit configured to separate the sheet from a plurality of sheets;
a pressing portion configured to press the separation unit toward the feeding roller; and
a holding portion configured to connect to the first feeding guide, to hold the separation unit, to receive the separation unit from a side of the holding portion that is opposite to a side opposing the feeding roller, and to move from a first position where the holding portion holds the separation unit in contact with the pressing portion to a second position where the holding portion holds the separation unit away from the pressing portion while remaining connected to the first feeding guide,
wherein the separation unit is configured to be removably attached to the holding portion.

7. The sheet feeding device according to claim 6, wherein the sheet feeding device further comprises a second feeding guide opposed to the first feeding guide, and
wherein the first feeding guide is configured to move toward and away from the second feeding guide, and to support the holding portion.

8. The sheet feeding device according to claim 7, wherein the holding portion is configured to move to the second position by moving in a direction opposite to a direction in which the first feeding guide moves away from the second feeding guide.

9. The sheet feeding device according to claim 7, further comprising an adjustment portion configured to correct a position of the separation unit when the separation unit is incorrectly inserted into the holding portion.

10. The sheet feeding device according to claim 7, wherein the feeding guide comprises a protrusion,
the holding portion comprises an engaging portion configured to engage with the separation unit,
the separation unit comprises an engaged portion configured to engage with the holding portion and a contact surface configured to assist in positioning the separation unit within the holding portion by contacting the protrusion,
a distance between the feeding guide and an edge of the engaging portion on a side opposite to the protrusion when the holding portion is in the first position is equal to or greater than a sum of a length of the protrusion in a protruding direction and a distance between the contact surface and the edge of the engaging portion when the holding portion is in the first position, and
a distance between the protrusion and the edge of the engaging portion when the holding portion is in the first position is less than a distance from the contact surface to an end of the engaged portion opposite to the protrusion.

11. The sheet feeding device according to claim 6, wherein the holding portion is configured to rotate between the first position and the second position.

12. The sheet feeding device according to claim 6, further comprising a sheet pressing portion configured to press the sheet toward the feeding roller, and
wherein the pressing portion is provided on the holding portion.

13. The sheet feeding device according to claim 12, wherein the sheet pressing portion comprises a conductive plate spring,
wherein the sheet feeding device further comprises a conductive member on the first feeding guide at a position to contact the conductive plate spring when the holding portion is in the first position, and
wherein the conductive member is configured to remain away from the conductive plate spring when the holding portion is in the second position.

14. The sheet feeding device according to claim 6, wherein the holding portion comprises a frame and an engaging portion,
wherein the separation unit comprises a separation pad, a pad holder configured to hold the separation pad and to be removably mounted to the frame, and an engaged portion configured to engage with the engaging portion when the pad holder is mounted to the frame, and
wherein the engaging portion makes sliding contact with the engaged portion while elastically deforming when the separation unit is removably mounted to the holding portion to allow the pad holder to engage with or disengage from the frame.

15. The sheet feeding device according to claim 6, wherein the holding portion comprises a sheet entry regulating portion configured to regulate a number of sheets that contact the separation pad when the holding portion is in the first position.

16. An apparatus, comprising:
a pressing portion configured to press a separation pad of a separation unit against a sheet; and
a holding portion configured to connect to a supporting member, to hold the separation unit, to move between a first position where the holding portion holds the separation unit in contact with the pressing portion and a second position where the holding portion holds the separation unit away from the pressing portion while remaining connected to the supporting member, and to receive the separation unit when the holding portion is in the second position from a side of the holding portion that opposes the pressing portion when the holding portion is in the first position.

17. The apparatus of claim 16, further comprising the separation unit.

18. The apparatus of claim 17, wherein the separation unit is configured to be removably attached to the holding portion.

19. The apparatus of claim 16, wherein the holding portion is pivotably connected to the supporting member.

20. The apparatus of claim 16, further comprising a feeding roller configured to feed a sheet, wherein the holding portion is configured to receive the separation unit from a side of the holding portion that is opposite to a side opposing the feeding roller.

* * * * *